G. A. MARTIN.
MANDREL FOR FORMING TUBULAR RUBBER GOODS.
APPLICATION FILED MAY 12, 1911.
1,055,547.  Patented Mar. 11, 1913.
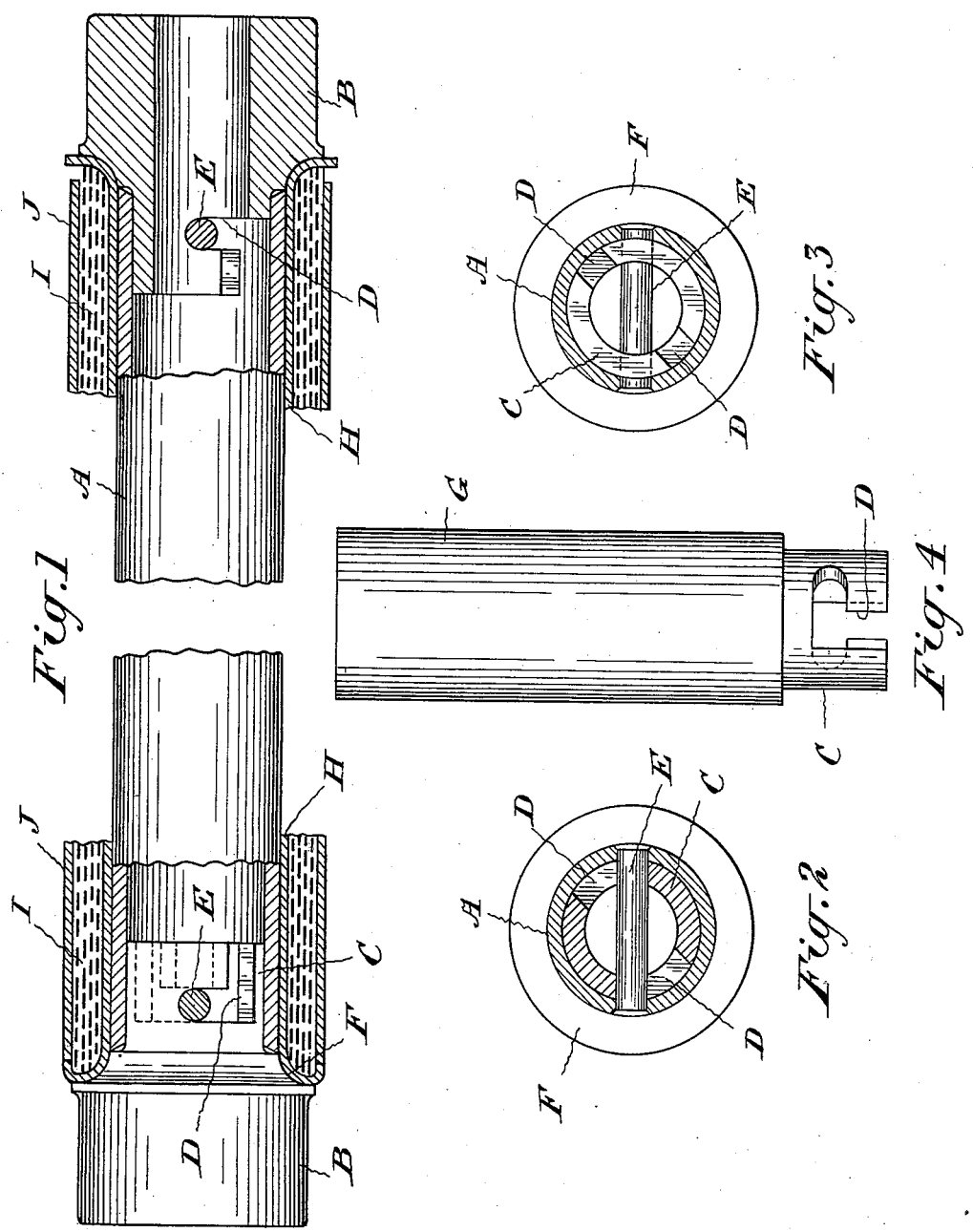
WITNESSES:
INVENTOR.
Geo. A. Martin
BY J. Edward Maybee
ATTORNEY.

UNITED STATES PATENT OFFICE.

GEORGE A. MARTIN, OF TORONTO, ONTARIO, CANADA, ASSIGNOR OF ONE-HALF TO GUTTA PERCHA AND RUBBER MANUFACTURING COMPANY OF TORONTO, LIMITED.

MANDREL FOR FORMING TUBULAR RUBBER GOODS.

1,055,547. Specification of Letters Patent. Patented Mar. 11, 1913.

Application filed May 12, 1911. Serial No. 626,749.

*To all whom it may concern:*

Be it known that I, GEORGE A. MARTIN, of the city of Toronto, in the Province of Ontario, Canada, have invented certain new and useful Improvements in Mandrels for Forming Tubular Rubber Goods, of which the following is a specification.

This invention relates particularly to means for forming tubular rubber goods such as hose, and particularly air brake hose, which requires to be made in short lengths and cannot be made satisfactorily by cutting up long pieces into short lengths.

Air brake hose usually is formed of an inner rubber tube, rubberized fabric wound thereon and an outer rubber cover. Such hose should be made accurate in length to a small fraction of an inch, the annular ends of its walls require to be sealed to cover the fabric with which they are strengthened, and the inner tube must be absolutely free from defects. With ordinary methods of manufacture it is very difficult to fulfil these requirements and much waste occurs owing to the necessity of scrapping defective lengths.

My object is to devise a construction of mandrel which will enable me to turn out lengths of air brake hose which will conform in all respects to the requirements and by which waste will be practically eliminated.

I attain my object by forming the mandrel of a cylinder of almost the exact length of the hose to be made upon it. This mandrel is provided with a removable end or ends of increased diameter which are shaped to suitably form the ends of the annular walls of the hose. A cylindrical extension of the same diameter as the tube is also provided adapted, when necessary, to take the place of one of the ends.

The parts are constructed in detail substantially as hereinafter described and illustrated in the accompanying drawings, in which—

Figure 1 is a side elevation, partly in section and partly broken away, of a mandrel constructed in accordance with my invention. Figs. 2 and 3 are cross-sections in different positions illustrating the lock for holding the detachable ends in place. Fig. 4 is a side elevation of the detachable mandrel extension.

In the drawings, like letters of reference indicate corresponding parts in the different figures.

The body of the mandrel A is cylindrical and preferably tubular in form. This mandrel is made slightly shorter than the length of the hose to be formed thereon. The ends B are of larger diameter than the body of the mandrel, preferably at their greatest diameter somewhat less than the external diameter of the hose to be formed. One or both of these ends are detachable. While any suitable connections might be employed it is advisable that the connection shall be such as to necessitate but a small turning movement of the end in securing it in place. The bayonet joint lends itself particularly well to my purposes. Each detachable end B is therefore provided with a tubular projection C adapted to fit within the hollow end of the mandrel. L-shaped slots D are formed in this tubular projection adapted to engage the pin E within the hollow end of the mandrel. This pin is preferably driven through the mandrel from side to side and its ends slightly upset or riveted to hold the pin in place, as shown particularly in Figs. 2 and 3. It will be seen that by pushing the end into place and slightly turning it, it will be securely locked.

The inner face F of each end B will be suitably shaped according to the shape the end of the hose is desired to assume. Preferably this face will be curved or tapered from the point of greatest diameter down to the same diameter as the external diameter of the body of the mandrel. This taper is preferably on a curve, as shown, and serves a double purpose. In the first place it gives the end of the hose a suitable shape to enable it to be slipped over the coupling to which it is to be connected; in the second place it performs a function in the manufacture of the hose, as will be hereinafter described.

G, in Fig. 4, is a mandrel extension which may be substituted for one of the ends B. For connection purposes it is provided with a tubular projection C provided with a slot D.

In forming hose with this apparatus the inner rubber tube H is slipped on or built up on the mandrel. As this inner tube must be longer than the length of hose, after removing one of the ends B, I insert the mandrel extension G which makes the mandrel of sufficient length to properly support the tube. The rubberized fabric I is then wound in place. This fabric is a fraction shorter than the extreme length of the finished hose. The outer rubber cover J is then placed in position. This, it will be seen, is slightly shorter than the fabric I. The hose is then slipped endwise on the mandrel toward the end B, which has been left in place. The adjacent projected end of the inner rubber tube H is thus spread outwardly by the face F of the end. The extension G is then removed and the other end B connected in its place. This end is easily inserted and as it is pressed home and locks in place spreads outwardly the adjacent projecting end of the inner tube H as shown. The ends of the rubber tube are then turned outwardly and rolled down to meet the ends of the outer cover J. The hose is then vulcanized on the mandrel and is subsequently removed therefrom in any suitable manner. It will be seen that as the points of connection between the ends of the mandrel lie at the extreme ends of the body of the mandrel the inner surface of the body of the tube will be perfectly clean and smooth from end to end. As the ends B determine the length of the finished hose the pieces will always be of uniform length and correct to a very small fraction of an inch. Furthermore, these detachable ends aid in giving the ends of the hose the preferred bell mouth shape and aid also in turning out the inner tube to seal up the ends of the fabric which would otherwise be exposed.

What I claim as my invention is:—

Apparatus for forming tubular rubber goods comprising a cylindrical tubular mandrel having a removable end provided with a tubular projection adapted to fit within the end of the mandrel, a bayonet joint connection being provided between the said tubular projection and the mandrel inside the active portion of said mandrel, and a cylindrical extension of the same diameter as the mandrel adapted to take the place of said detachable end.

Toronto this 10th day of May 1911.

GEORGE A. MARTIN.

Signed in the presence of—
J. Edw. Maybee,
E. P. Hall.

---

Copies of this patent may be obtained for five cents each, by addressing the "Commissioner of Patents, Washington, D. C."